US007379706B2

(12) United States Patent
Montebruno et al.

(10) Patent No.: US 7,379,706 B2
(45) Date of Patent: May 27, 2008

(54) METHODS AND APPARATUSES FOR INTEGRATION OF BROADCAST TRANSMISSION WITH ACCESS INFRASTRUCTURE OF A PUBLIC NETWORK FOR MOBILE COMMUNICATIONS

(75) Inventors: Lidia Montebruno, Turin (IT); Alessandro Striuli, Mestre (IT); Marcello Vignoli, Turin (IT)

(73) Assignee: ITEC S.r.l., Turin (IT)

( * ) Notice: Subject to any disclaimer, the term of this patent is extended or adjusted under 35 U.S.C. 154(b) by 383 days.

(21) Appl. No.: 10/468,166

(22) PCT Filed: Mar. 6, 2002

(86) PCT No.: PCT/IB02/00666

§ 371 (c)(1),
(2), (4) Date: Sep. 14, 2003

(87) PCT Pub. No.: WO02/071649

PCT Pub. Date: Sep. 12, 2002

(65) Prior Publication Data

US 2004/0192198 A1 Sep. 30, 2004

(30) Foreign Application Priority Data

Mar. 8, 2001 (IT) ............................ TO2001A0207

(51) Int. Cl.
*H04H 20/71* (2008.01)
(52) U.S. Cl. ...................................... 455/3.01; 455/13.1
(58) Field of Classification Search ............ 455/422.1, 455/427, 428, 13.1, 13.2, 3.02, 3.05, 3.04, 455/432.1, 435.2, 436–439, 3.06, 7, 12.1, 455/15, 16, 3.01; 370/278

See application file for complete search history.

(56) References Cited

U.S. PATENT DOCUMENTS

| | | | | |
|---|---|---|---|---|
| 5,862,480 A | * | 1/1999 | Wild et al. | 455/432.2 |
| 5,915,207 A | * | 6/1999 | Dao et al. | 455/9 |
| 5,963,862 A | * | 10/1999 | Adiwoso et al. | 455/430 |
| 6,125,283 A | * | 9/2000 | Kolev et al. | 455/552.1 |
| 6,137,783 A | * | 10/2000 | Sallberg | 370/316 |
| 6,157,834 A | * | 12/2000 | Helm et al. | 455/436 |
| 6,272,339 B1 | * | 8/2001 | Wiedeman | 455/426.1 |
| 6,456,847 B1 | * | 9/2002 | Lilja et al. | 455/437 |
| 6,466,554 B2 | * | 10/2002 | Okada | 370/312 |
| 6,535,731 B1 | * | 3/2003 | Pillekamp et al. | 455/444 |
| 6,625,443 B1 | * | 9/2003 | Kamperschroer et al. | 455/414.1 |
| 7,155,161 B2 | * | 12/2006 | Regulinski et al. | 455/13.1 |
| 2001/0022782 A1 | * | 9/2001 | Steudle | 370/335 |
| 2003/0054762 A1 | * | 3/2003 | Karabinis | 455/12.1 |

* cited by examiner

*Primary Examiner*—Tu Nguyen
(74) *Attorney, Agent, or Firm*—Levine & Mandelbaum

(57) ABSTRACT

A telecommunications network for mobile users includes a user subsystem and a transport subsystem connected to an access subsystem. The access subsystem provides a user access communications interface and a transport access communications interface for exchange of information among the subsystems. The access subsystem is identified with a coverage area of the cellular telecommunication network. The access subsystem is associated with interconnection means in order to receive second information signals broadcast from one or more geostationary satellites and send them via the telecommunications network for mobile users to users located within the coverage area of the mobile telecommunications network.

20 Claims, 3 Drawing Sheets

METHODS AND APPARATUSES FOR INTEGRATION OF BROADCAST TRANSMISSION WITH ACCESS INFRASTRUCTURE OF A PUBLIC NETWORK FOR MOBILE COMMUNICATIONS

BACKGROUND OF THE INVENTION

The present invention relates to a telecommunications network for mobile users, said telecommunications network for mobile users comprising a user's subsystem and a transport subsystem connected by means of an access subsystem, which offers them respectively a user access communications interface and a transport access communications interface (Iu), suitable to permit the exchange of the information flows (TS) among said subsystems, said access subsystem (AST) singling-out a coverage area of the cellular telephone network. Based on various analyses, it is expected that in a short time we will see a large increase in the quantity of information exchanged between users equipped with mobile radiotelephone terminals and the networks of the providers of such services. In light of such future needs, various national and international organizations(e.g. ITU, ETSI, FCC, etc.) dealing with regulations affecting radio frequencies allocation and utilization and the relative standards of data processing and signal modulation techniques, agreed on the definition of standards (or a group of standards like the GSM GPRS and the IMT 2000 or 3G) which allows a significant increase in the velocity of exchange between the mobile networks and the user mobile terminal and vice versa. The IMT 2000 group of standards, for example, includes the new standards called CDMA 2000 and Universal Mobile Telecommunications System (UMTS) or 3G (third generation) that allow video-conferencing and compatibility with the protocols of Internet networks (e.g., Ipv6) with other networks of the same family (e.g., DECT), and with the previous generation (2G) wireless telephone networks (e.g., GSM and PCS) and their improved data transport versions such as GPRS, EDGE, etc., (usually referred to as 2.5G). At the same time, new software and signal processing methodologies and standards are continuously developed in order to minimize the request for bandwidth for the digital broadcasting of Video Clips, TV programs and Audio programs and to allow the transmission of video, music, voice and images on digital networks such as Internet, Intranet and the like, and wireless cellular networks as well as wireless local area networks. In addition, all the technologies required to produce efficient and smart wireless mobile terminal at low cost are in constant and rapid development. These technologies contribute in the production of portable radio terminals capable of incorporating into the basic telephone function, various additional complex functions (graphic visualization with satisfactory resolution, functions typical of PCs, the capacity to interpret and elaborate various standards and protocols of the Internet field, storage of large quantities of data and management of serial interfaces, elaboration and reproduction of audio and visual files according to various standards, management of serial interfaces by modem, and infrared and radio interfaces for the exchange of data over short distances with other digital devices or network gateways, reception and processing of GPS signals, execution of complex interactive games, rapid decryption of files, voice recognition and synthesis, etc.).

It seems correct, then, to assume that the diffusion of new terminals capable of providing an efficient Internet connection, showing videos, graphics and of reproducing voice, music, and television file-data, also downloadable from the Internet, will result in a dramatic increase in the quantity of transmitted data in the terrestrial radio networks for mobile phones.

Therefore, in addition to the implementation of improved standards, in order to provide a qualitatively acceptable service to customers, the wireless network providers will be forced to continually increase their investment in upgrading their network capacities to meet the increasing data traffic demand.

A good example is the third generation (3G) of cellular networks, based on the UMTS standard, which are designed for multimedia communications. With these systems, personal communications can be improved with quality images and/or video and access to the information or services on public and private networks and can be improved by utilizing the highest data rate available and the highest communication flexibility for each system.

Such systems possess, among other things, the following characteristics:

Variable bit rate in order to furnish a wider bandwidth compatible with the service requested (from about 16 KBPS for voice communication to about 384 Kbps, and up to 2 Mbps for "High Multimedia" services);
  Multiplexing services with different quality requirements in a single connection;
  Quality requirements from 10% frame error to $10^{-6}$-bit error rate;
  Compatibility with second-generation and 2.5 G systems (e.g., GSM handover intersystems for better coverage and traffic balance)
  Support for asymmetric traffic for uplinks (from user to provider) and downlinks (from provider to user)
  High efficiency in spectrum utilization
  Compatibility of FDD (Frequency Division Duplex) and TDD (Time Division Duplex) connection modes.

Among the most important characteristics of the network based on the UMTS standard are the high user bit rate, compatibility with Internet standards, the capability to run multimedia files and the "always on" connection mode for the terminal.

It is logical to predict that initial use of the UMTS network will be constituted primarily of voice and Internet content while the amount of multimedia data traffic will increase later. Since the requested information will be primarily available on the Internet, it is important to implement efficient management of the TCP/UDP/IP traffic in the UMTS network. To be successful, the UMTS must be, therefore, capable of supporting a wide array of applications with different performance and quality service requirements.

The UMTS network at the level of network architecture, consists of a combination of logical network elements each with a specific functionality. In the context of standards, both the logical elements and the open interfaces among them are defined so that it is possible to automatically identify the network's physical elements as well.

The presence of open interfaces, in particular in the access network called UTRAN (UMTS Terrestrial Radio Access Network) in 3G standard, allows interconnection to the UMTS network as well to modes not explicitly envisioned by the current standards. For what concerns the detailed description of the services and performance standardized or in the course of definition for the mobile telephone networks 2.5G and 3G, please refer to the product documentation of the groups 3GPP and 3GPP2 (Third Generation Partnership Project and Third Generation Partnership Project 2) for which a synthesis is available in publications such as "WCDMA for UMTS" by Holma and Toskala, John Wiley & Sons, 2000, while in the enclosed FIG. 1, which is described below, some elements of the UMTS network, which are necessary in order to describe the invention, are shown.

FIG. 1 shows a diagram of the highest level architecture of a popular type of telecommunications network for UNET mobile users according to the UMTS standard that comprises three subsystems all three of which are interconnected:-user terminal subsystem (STU, which in the standard is indicated as User Equipment. This user terminal subsystem STU constitutes the user terminal system, that is, the portable terminal, such as for example a cellular phone. Said user terminal subsystem (STU) is interconnected to the telecommunications network for mobile users UNET and in particular to an access subsystem STA through a user access interface Uu by which data and voice TS signals are received and transmitted. This user access interface Uu, as previously mentioned, is an open type in order to allow operation in association with a greater number of terminal brands. The user terminal subsystem is comprised of a user ID module USIM, analogous to the so-called SIM card of the GSM standard, and a mobile equipment ME, that is the cellular phone hand set that communicates by means of a specially designed equipment interface Cu.

access subsystem STA: said access subsystem STA constitutes the network access for the UMTS standard, the above-mentioned UTRAN system and connects to a transport network STT through a transport access interface Iu.

transport subsystem STT: this transport subsystem, identified as Core Network in the UMTS standard, constitutes the transport network of the UMTS system. This transport subsystem, in addition to being interconnected by means of an transport/access interface Iu to the access subsystem STA, must be able to interconnect with all the other existing networks (external networks, PSTN, ISDN, B-ISDN, Internet, etc.), that are identified in FIG. 1 by means of the EXTNET block. Included in said transport subsystem STT are means for information management, routing and switching, which are typical of the wireless telephone networks including a Mobile Services Switching Center MSC, a Home Location Register HLR and a database Visitor Location Center VLR, an interconnection node or Gateway Mobile Switching Center GMSC, and a node for running the Serving GPRS Support Node SGSN or GGSN (Gateway GPRS Serving/Support Node).

In FIG. 1, it is possible to see, inside of the access subsystem STA, base stations SNB that correspond to the base stations as defined as Node B in the UMTS standard, such as the radio stations that broadcast over the area that identify the cells or system domains of the mobile phones. Their primary function consists of the exchange of the radio interface Uu with the data and voice signal TS with the user terminal subsystem STU. These base stations SNB carry out the management of the principal radio resources as, for example, the power.

Inside the access subsystem STA is included, among other things, a network radio controller CRR (called Radio Network Controller in the UMTS standard). This radio network controller CRR has complete control of all the radio resources of its domain, including all the base stations SNB connected to the CRR by means of dedicated controller-stations interface Iub.

The radio network controller CRR manages one or more base stations SNB, manages the setting of the radio channels (setup and release of the connections), the frequency hopping, the internal handovers and other functions, communicating with the transport subsystem STU, in particular with the switching center MSC. A great number of base stations SNB are present in large urban areas controlled by just a few radio network controllers CRR.

Due to predictable growth required by multimedia information exchange, the network UNET described in FIG. 1 will have to carry an increasing traffic, which from the external networks EXTNET must be transmitted bidirectionally across the transport/access interface Iu and the access/user interface Uu. As mentioned above, in order to furnish a service qualitatively acceptable to customers the managers of the UMTS networks and wireless networks in general, are forced to provide continued investments to match the capacity of the networks to the increasing demand. In addition, the demand for new services will call for additional resources dedicated to the planning, implementation and management of such new services, which will result in a further increase of implementation costs and time.

SUMMARY OF THE INVENTION

The present invention has for aim to resolve the drawbacks and disadvantages cited above and to provide a telecommunications network for mobile users that is improved and more efficient with respect to the noted solutions.

In this frame, the principal object of the invention is to propose a telecommunications network for mobile users, which permits the user to receive data with a high transport capacity.

Another object of the invention is to propose a telecommunications network for mobile users that permits simple and economical implementation of new types of services.

A final object of the invention is to provide a telecommunications network for mobile users that is compatible with the current and new cellular telephone standards (e.g. IMT 2000) and in particular, the UMTS standards.

In order to achieve such aims, it is the object of the present invention to provide A telecommunications network for mobile users and/or base station and/or radio network controller and/or a method/means for sending information incorporating the features of the annexed claims, which form an integral part of the description herein.

DESCRIPTION OF THE DRAWINGS

Further objects, features and advantages of the present invention will become apparent from the following detailed description and annexed drawings, which are supplied by way of non limiting example, wherein.

DESCRIPTION OF THE PREFERRED EMBODIMENT

The invention is based on the observation that a great part of new multimedia traffic will be asymmetrical in the sense that the major part of the data flow will go from the network to the users and that a great part of such requests for data appear compatible with broadcasting and multicasting transmissions, these last, interactively personalized by the customer and by the network manager as a function of events, interests, demand and of typical cycles in the clients activities. In this perspective, a network architecture is envisioned that, in order to respect the new standards, allows a significant increase in the capacity in the most economical and the fastest to implement.

It seems desirable, therefore, to integrate the planned wireless terrestrial networks with elements of other networks, for the most part already in existence, which are characterized by an elevated level of reliability, by high transport capacity, by modest access costs and by the requirement of extremely low cost interface apparatus. In particular, geostationary satellites dedicated to broadcasting digital, (or also analog), TV, audio channels and Internet content channels or data streams and programs specifically dedicated to the mobile users, appear to be the most feasible for integrating with 2.5G or 3G wireless networks and for economically transferring the major part of the new multimedia traffic envisaged for the future.

It may be operatively economical as well both for informative services on a global, national or local scale to functionally integrate, alongside the connection with said satellites, with terrestrial TV or audio radio transmissions broadcast in analog modulation and in near time, in digital format (e.g., DVB-T, DAB-T iDAB, DRM or similar standards or their derivatives).

The inventive idea consists, therefore, of the integration of the broadcast transmission of the transmitting geostationary satellites, with the possible addition of broadcasting from terrestrial stations, with the access network of the UMTS system (UTRAN), namely in peripheral areas as well as those near the users, of the telecommunications network for mobile users.

This integration allows the utilization of geostationary satellites that typically require oriented antennae (not appropriate for providing of mobile services) to offer mobile services. This result is possible through utilization of parabolic antennae, e.g., fixed and oriented, installed at each base station SNB or at each network radio controller CRR, connecting the satellite transmitted content, through a decoding/encoding unit and making it accessible to the radio resources of the UMTS network being run by the base stations SNB. This allows the users of the telecommunications network UNET to exploit the services that otherwise require a fixed connection without increasing significantly the traffic on the transport subsystem STT.

Figure 1:
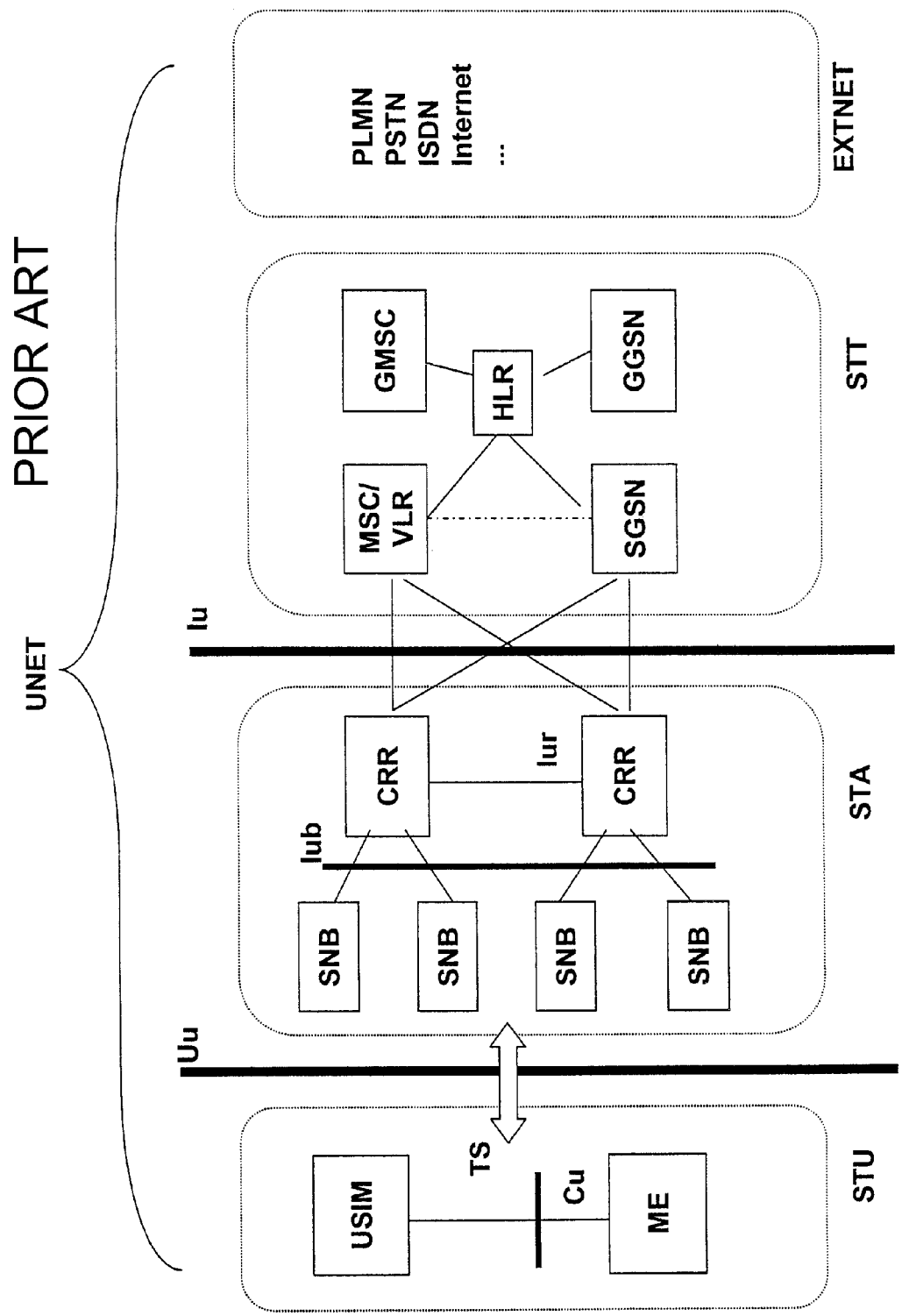
FIG. 1 shows a basic diagram of a mobile telecommunications network according to the prior art.
Figure 2:
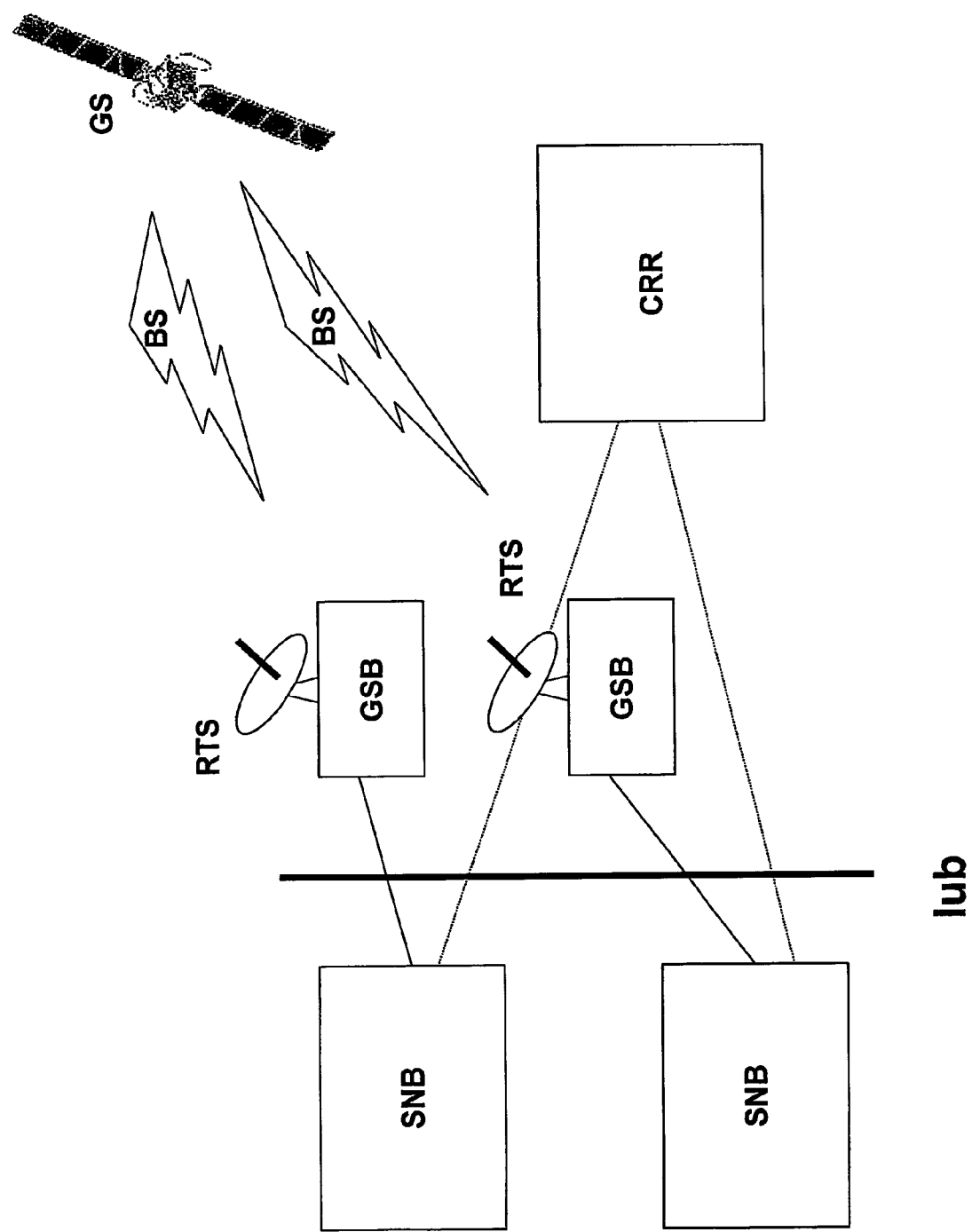
FIG. 2 shows a basic diagram of a network element of a telecommunications network for mobile users according to the invention.

In FIG. 2, the block diagram shows base stations according to the invention. The base stations SNB are connected to a satellite interconnection device GSB, that implements a station controller interface Iub like that described in FIG. 1, to the base stations SNB satellites and in addition is equipped with means for satellite reception RTS in order to connect with one or more geostationary satellites. For that purpose in FIG. 2 a geostationary satellite GS which transmits BS in broadcast mode satellite channels, that are received by means for satellite reception RTS and are transferred through interface Iub to the base station SNB, that broadcasts then the content of the satellite channel BS in the coverage area of its cell.

Said means for satellite reception RTS is completely analog to those for receiving domestic television programming and can include for example, Low Noise Block amplifier/downconverter LNB, a decoder with a satellite signal format and a re-coder in one or more standards compatible with UMTS specifications for the types of expected services. A conceptually equivalent solution, with a different antenna and receiver-digitizer-encoding unit, allows the routing to the SNB and finally to the user terminal, of terrestrial broadcasting analog stations (audio, TV or dedicated full-band or sub-band programs) or, with a different antenna-receiver-decoder-re-coder unit, terrestrial digital stations (audio, TV or dedicated programs or sub-programs).

Some of the possible services and data streams could also be reserved for the operators of emergency public protection, security services or general/public utility services.

Figure 3:
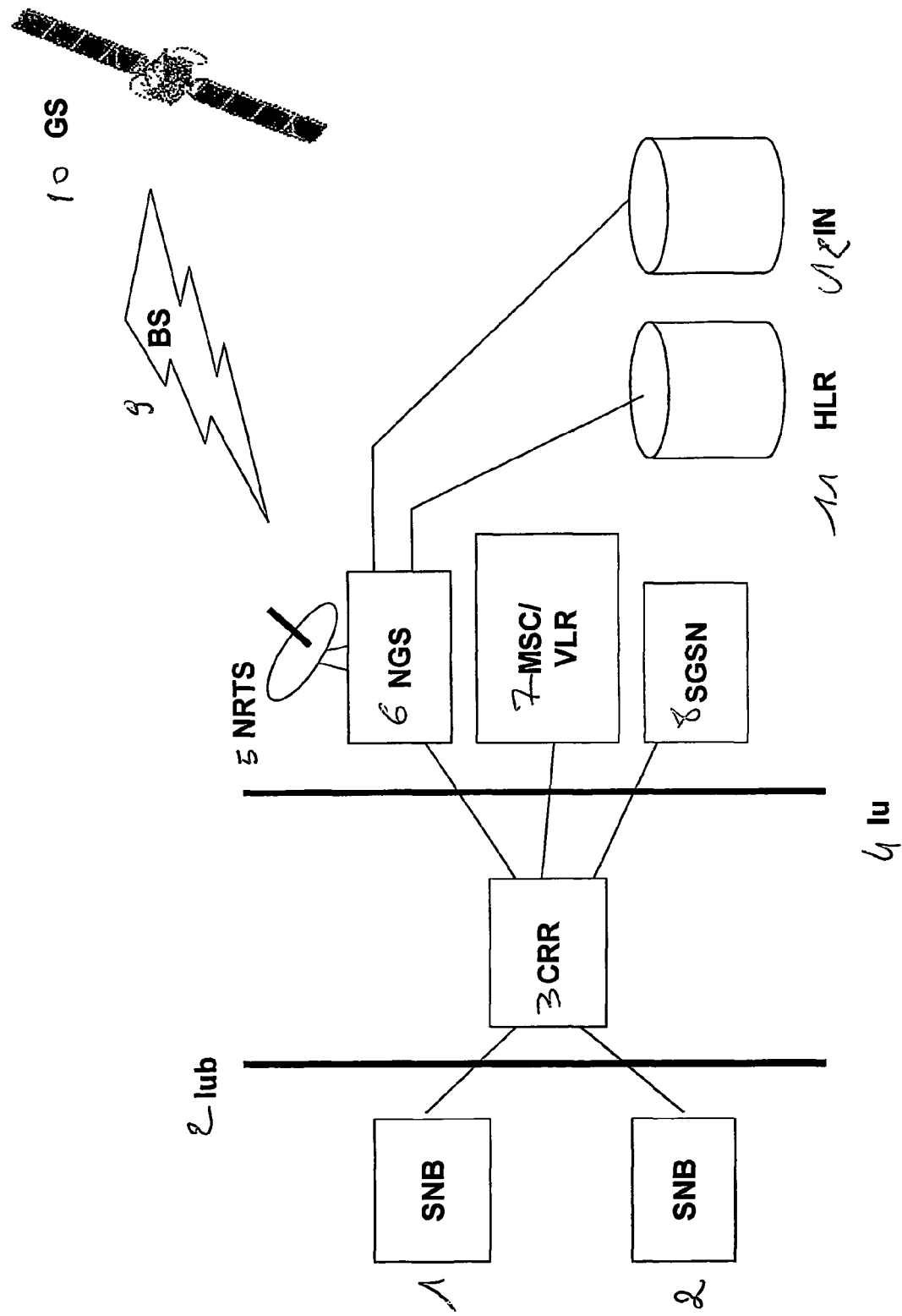
FIG. 3 shows a basic diagram of a network element of a telecommunications network for mobile users variant to the network shown in FIG. 2.

Instead, FIG. 3 shows a device for network satellite interconnection NGS that is equipped with an transport/access interface Iu toward the radio network controller CRR and by means for satellite reception NRTS. The device for network satellite interconnection NGS is, therefore, connected to the radio network controller CRR. The device for network satellite interconnection NGS, situated on a hierarchical network level of that of the transport system STT can also run all the communications that are necessary with database HLR. Said database HLR as known, contains all the information relative to each single user which are necessary for managing the customer and his mobility, i.e. it constitutes the database on which a network management system permanently stores the various data relative to the users who have subscribed through it. For simpler services, may not be necessary to communicate with the network resources that control and manage user mobility. In other words, the device for network satellite interconnection NGS could operate without knowing where the various users are located. In the case of personalized service, the information on the location of a particular user can be used instead for the construction of the service. In that case, it becomes important to communicate with the database HLR. For the same hierarchical level reason, the above device for network satellite interconnection NGS will be able to run all of the communications that are necessary with an Intelligent Network node (IN). Such nodes contain all of the information relative to each single user that is necessary to be able to manage complex communications services. Both the database HLR and the Intelligent Network nodes IN are network elements with open interfaces with standardized communication protocols.

The telecommunications network for mobile users UNET equipped for the base stations SNB and/or the radio network controllers CRR described above permit such applications as:

Internet navigation (web type) of high quality.

Extremely efficient personalized data streaming (e.g. e-mail, multimedia mail, dedicated special data etc,).

One or more broadcast channels (standard TV or Audio channels or mobile user dedicated contents, data and Video clips) provided to all authorized mobile customers.

A single Service Center is sufficient for the entire network and no more than a minimal amount of communication data between terminals and Service Centers is required to manage these additional services.

For quality Internet services, it will be possible to use services based on updatable databases (e.g., e-commerce, reservations, etc.). The quality of these services depends primarily on the number of access points available to the network that can be co-locatable with SGSN. A large number of access points can be updated easily via satellite.

For access to the satellite Internet Service Providers ISP using the high downlink capacity provided by the satellite, it is possible to extend their offer to UMTS mobile customers (without any type of modification to the user terminal) and therefore to all those that have an UMTS terminal authorized for this service. Regarding personalized streaming, it will be possible to receive on the user UMTS terminal, directly from the base station, the data streams (e.g., some Mb) with personalized content such as, newspapers, stock market information, sports news or other subscription services. For this reason, the device for network satellite interconnection GSB or NGS can be equipped with storage capability in such a way as to be capable of storing the BS flow data sent from the satellite GS. The satellite GS can send informative content at regular intervals, such as a news service that changes slowly and in small parts over time. In that way, it will be possible by request from the user terminal keyboard, to transmit via satellite only the specific variations/updates requested by that user. For example, the news service contains national news stored in the memory of the device for network satellite interconnection GSB or NGS, whereas, after the user's request for the news service, the satellite BS will send a local bulletin or expand on specific subjects. In this way, the information content load can be diminished by the carrier on the signal BS sent by the satellite GS.

If, for example, a channel is reserved for the base station for such services performed by the additional data flows BS, each cell can serve up to 10 customers per minute and a single Service Center is all that is needed for the entire network. This is obtainable with a quite small amount of data between the terminals and the Service Center.

The description above should provide a clear idea of the characteristics and advantages of the invention.

The telecommunications network for mobile users according to the invention allows an increased data transport capacity since it provides an integrated architecture capable of carrying heavy multimedia data flows via satellite directly to the base stations to which the users are connected with their terminals, thus avoiding traffic saturation in the terrestrial transport network.

A further advantage is that, with a single satellite radio emission, all of the base stations belonging to one provider (tens of thousands) begin to operate, one-by-one, as they are installed. Equipping the base stations and/or the antenna radio controllers and related apparatus for satellite reception, it is as if each mobile terminal can receive multimedia programs directly from the geostationary satellite. The use of a system of geostationary satellites that broadcast the information is particularly advantageous in that the reception systems with which the base stations or the controllers CRR have to be equipped (interface apparatus, antenna, LNB, decoder, re-coder to standards compatible with the UMTS environment), are simple and economical.

In addition, the leasing of similar channels or satellite transponders or parts of the transponders is particularly cost effective with respect to development of services specifically for mobile phones. The telecommunications network for mobile users according to the invention, furthermore, makes advantageous use of base stations and controllers that are already part of the area covered by the cellular network that is, of its access system. It will be appreciated, then, that the aforementioned mobile telecommunications network, according to the invention, differs from the type of network that integrates a terrestrial network for mobile users with a mobile satellite network. These networks tend to increase the coverage of service areas not covered (typically due to a low density of customers) but do not permit the increase of the bit rate that is instead advantageously obtained according to the invention and without increasing significantly the traffic in the transport network.

The telecommunications network for mobile users, according to the invention, permits the use of services that are planned with maximum flexibility and ease of implementation in the shortest time. This allows to obtain advantages in the quality/cost ratio of services offered using broadcast or multicast mode satellites.

A further advantage is the possibility of broadcasting or multicasting directly.

In addition, the telecommunications network for mobile users, using our invention, is compatible with UMTS and CDMA 2000 or other similar standards of the 3G family. It is also compatible with future systems based on an analogous architecture, which make use of open interfaces, or with updated older systems such as GPRS.

Furthermore, the telecommunications network for mobile users according to the invention advantageously allow the provider to strategically optimize the bandwidth such in certain instances in which the user cannot look at the video (while driving, at work, etc.) but can listen to audio programs. Statistically, the users' activities tend to be cyclical (e.g., breakfast, driving to work, work, lunch, work, driving home, personal activities, etc.).

The continued miniaturization of the mass memory and the rapid evolution of the elaboration power of small microprocessors lead to believe that within a short time it will be possible to produce compact terminals capable of both storing films, music, personalized video or audio news on different themes, and running images, graphics and audio messages or text via e-mail.

It is believed, further, that multimedia service providers will also move toward furnishing interactive TV as well as music and audio services with content and updates selected by the customer.

Such an approach, compatible with the connection mode "always on" offered by the GPRS and UMTS systems, will advantageously allow the provider to minimize the request for bandwidth in the peak hours in that he can turn to the memory caching at various levels (in network radio controllers, in the base stations and in the user terminals).

It is obvious that many changes are possible for the man skilled in the art to the telecommunications networks for mobile users and/or base stations and/or radio network controllers and/or the method for sending the information described above by way of example, without departing from the novelty spirit of the innovative idea, and it is also clear that in practical actuation of the invention the components may often differ in form and size from the ones described and be replaced with technical equivalent elements.

For example, future availability of geostationary satellites with large bandwidth capable of exchanging large quantities of bi-directional data flows with single users equipped with suitable fixed, low-cost domestic satellite radio receivers, equipping the radio controllers and a certain number of base stations of the access network with the necessary apparatuses to realize such bidirectional satellite connections, will allow users, for whom a brief response delay is tolerable, the possibility of video-conferencing or transmitting videos over long distances without overloading the terrestrial networks, while, for the providers, it will also become possible to install remote base stations (also additional or temporary)

in locations devoid of infrastructure for telecommunications or with inadequate or incompatible infrastructure.

The base station, according to the invention, allows bi-directional communication between satellite and UMTS terminals; in FIGS. 2 and 3 only the downlink is described, i.e., the communication from the provider to the user, because this transmission direction is currently more relevant and can offer major economic advantages in the near future by offering quality, innovative services to UMTS users.

Access to the UMTS interfaces, however, allows the use of the access subsystem not only as an access network to the UMTS transport network but also as an access infrastructure of a satellite network. The architecture shown allows those with new generation mobile terminals to directly access satellite broadcasting services (typically TV, "CD quality" audio and Internet or personalized data) until now reserved for the users equipped with the appropriate domestic satellite interface.

Since a typical base station can run a limited number of channels at a high speed, it appears cost-effective to make use of only a small number (typically one or two) with non-interactive or partially interactive television channels. Part of the base stations can be installed on buildings. Since there are various elements in common between the satellite connection systems integrated in the base station and a system of domestic satellite connections, it may be cost-effective to organize the base stations with elements of the domestic satellite connection system in order to be able to quickly and economically carry out the functions of the shared satellite connection system for the entire building. Focusing again on use of the preexisting building wide shared equipment, it will be possible to equip a new base station utilizing a preexisting satellite antenna on a house, apartment or office building.

Finally, it is clear that the telecommunications network, using our invention, is not limited to the architecture required for UMTS. For example, it can be used in relation to the 2.5 standard when dealing with the GPRS or the DECT systems.

The telecommunications network according to the invention finds also application integrated with wireless LAN (Local Area Network), like that supported by Bluetooth, or Weca (Wireless Ethernet Compatibility Alliance) IEEE802.11 A or B, or even HomeRF or also non Ethernet based. Signals according to said protocols can be carried through low mobility picocells access subsystem (e.g. in supermarkets, airports) of UMTS (or GPRS) networks, that, according to the invention, are associated to satellitar antennae. Said subsytems according to the invention are integrated with access points (AP for Weca) of the above mentioned wireless in order to broadcast towards terminal users that receive both on the UMTS frequency and on the LAN frequency, informations that can be different and local with respect to that broadcast by the normal UMTS service, and also additional with respect to that normally broadcast through the LAN and its servers.

The invention claimed is:

1. In a cellular telecommunications network having
   an access subsystem including a plurality of base stations and one or more controllers of said base stations,
   a transport subsystem operatively connected to said controllers of said base stations for implementing routing and switching functions of said cellular telecommunication network,
   a plurality of user terminal systems each of which is operatively connected to one of said base stations for accessing said telecommunication network,
   the improvement wherein said cellular communication network comprises,
   broadcast means for transmitting broadcast information signals from at least one source external to said cellular telecommunications network, and
   receiver means operatively connected to said plurality of base stations for directly receiving said information signals from said broadcast means, whereby said broadcast information signals can be broadcasted from said base stations to said user terminal systems without burdening said transport subsystem,
   and access subsystem comprises picocells.

2. A cellular telecommunications network according to claim 1, wherein the cellular telecommunications network is a network according to the Universal Mobile Telecommunications System standard and the access subsystem is of the UMTS Terrestrial Radio Access Network type.

3. A cellular telecommunications network according to claim 1, wherein the cellular telecommunications network uses Digital Enhanced Cordless Telecommunications and the UMTS Terrestrial Radio Access Network as the access subsystem.

4. A cellular telecommunications network according to claim 1, wherein said broadcast means comprises a terrestrial radio transmitter.

5. A cellular telecommunications network according to claim 1 wherein said receiver means includes at least one storage means for storing at least some of the information of said information signals.

6. A cellular telecommunications network according to claim 1 wherein said broadcast means is adapted for terrestrial broadcasting and said receiver means comprises means for two-way terrestrial broadcast signals.

7. A cellular telecommunications network according to claim 1 wherein said access subsystem is shared with a wireless Local Area Network in order to allow sending said information signals over said wireless Local Area Network.

8. A cellular telecommunications network according to claim 1, wherein said broadcast means comprise at least one geostationary satellite.

9. A cellular telecommunications network according to claim 8, wherein said receiver means comprises means for reception of signals from said geostationary satellite.

10. A cellular telecommunications network according to claim 9, wherein said base stations further comprise means for transmission to the geostationary satellite operatively connected to said receiver means.

11. A cellular telecommunications network according to claim 9, wherein the receiver means comprise low-cost domestic satellite radio receivers.

12. A cellular telecommunications network according to claim 1 wherein said receiver means are operatively connected to said plurality of base stations through said one or more controllers of said base stations.

13. A cellular telecommunications network according to claim 1 wherein said base stations broadcast said information signals independently of whether said information signals are received by said user terminal systems.

14. A method of enabling a plurality of users, each of whom employs a respective user terminal system to individually communicate by first information signals which are switched and routed in a transport subsystem of a public cellular telecommunications network, to collectively receive second information signals on said user terminal systems, said public cellular telecommunications network having
- an access subsystem for enabling said users to connect to said public cellular telecommunications network through a plurality of base stations,
- one or more controllers of said base stations, each of said controllers of said base stations being operatively connected to said transport subsystem for permitting bidirectional communication therebetween,
- said method comprising:
- broadcasting said second information signals from at least one source external to said cellular telecommunications network,
- receiving said information signals at a receiver remote from said transport subsystem,
- applying said received second information signals from said receiver to said base stations, and further broadcasting said second information signals from each of said base stations to one or more of said user terminal systems without increasing the burden on said transport subsystem beyond that resulting from said first information signal,
- said access subsystem comprising picocells.

15. A method according to claim 14 wherein said broadcasting of said second information signals is done through at least one geostationary satellite.

16. A method according to claim 15 further comprising using an access subsystem of said telecommunications network as an access system to said geostationary satellite for user terminals of the cellular telecommunications network in order to allow bidirectional communications between said user terminals and said satellite.

17. A method according to claim 15 further comprising integrating at least one of said base station and/or controllers of said base stations of said cellular telecommunications network with two-way satellite systems for single family homes or apartment buildings.

18. A method according to claim 15 further comprising integrating at least one of said base stations and/or controllers of said base stations of said cellular telecommunications network with two-way satellite systems.

19. A method according to claim 14 wherein said received second information signals are applied from said receiver to said base stations through said one or more controllers of said base stations.

20. A method according to claim 14 wherein said second information signals are broadcasted by said base stations independently of whether said information signals are received by said user terminal systems.

* * * * *